３,191,965
BICYCLE CONSTRUCTION
Samuel Wilkens, 4 Leonard Drive, East Rockaway, N.Y.
Filed Mar. 3, 1964, Ser. No. 349,099
4 Claims. (Cl. 280—231)

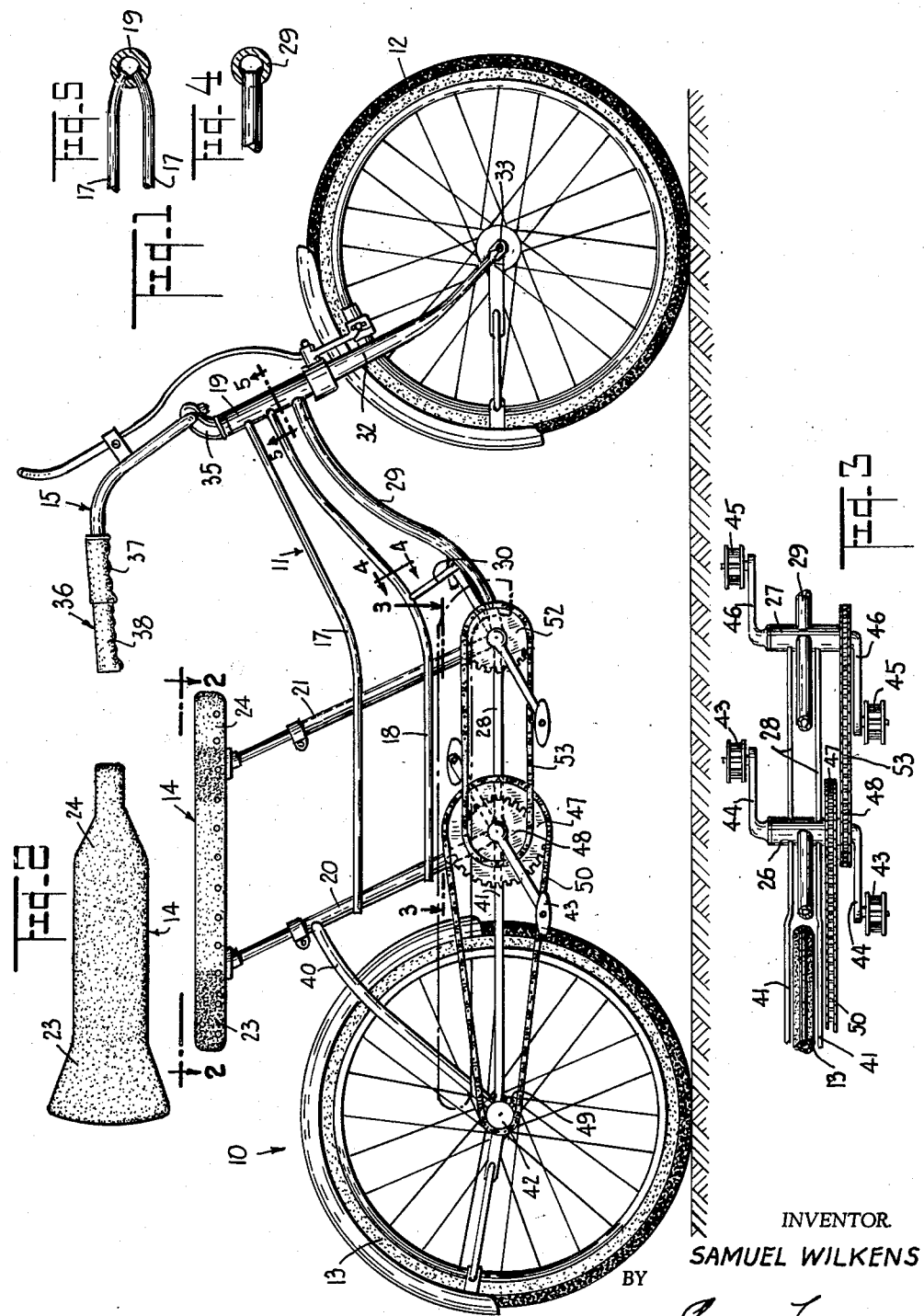

This invention relates generally to bicycles, and is especially concerned with unique improvements in tandem-type bicycles.

It is an important object of the present invention to provide a bicycle construction for a plurality of occupants or users, wherein all occupants participate both in powering and steering the vehicle.

It is another object of the present invention to provide a tandem-bicycle construction which may optionally be operated by a single occupant or user from any station or seat, either front or rear.

Still another object of the present invention resides in the provision of a unique tandem-bicycle construction which is relatively simple in construction, having a shorter wheel base and less components than heretofore required, is extremely durable and reliable throughout a long useful life, and which is capable of highly attractive design.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a side elevational view showing a bicycle constructed in accordance with the teachings of the present invention.

FIGURE 2 is a top plan view taken generally along the line 2—2 of FIGURE 1.

FIGURE 3 is a horizontal sectional view taken generally along the line 3—3 of FIGURE 1.

FIGURE 4 is a partial sectional view taken generally along the line 4—4 of FIGURE 1.

FIGURE 5 is a partial sectional view taken generally along the line 5—5 of FIGURE 1.

Referring now more particularly to the drawings, and specifically to FIGURE 1 thereof, a tandem bicycle is there generally designated 10 and includes a frame 11, front and rear wheels 12 and 13, a seat 14, and handlebar 15.

The frame 11 normally lies in a generally vertical plane and includes a pair of longitudinally extending, laterally spaced upper frame members 17, below which are arranged a pair of laterally spaced, longitudinally extending intermediate frame members 18. The longitudinal upper and intermediate pairs of frame members 17 and 18 are connected at their forward ends to a generally upstanding, rearwardly inclined steering column 19. A rear, generally upstanding seat column 20 extends between and is rigidly secured to the frame members of each pair 17 and 18, at the rear ends thereof. Further, the seat column 20 extends upward beyond the upper longitudinal frame member 17, and downward beyond the intermediate longitudinal frame members 18. Forwardly of the rear seat column 20 is a front seat column 21 of generally upstanding disposition which extends between and is rigidly secured to the frame members of each pair 17 and 18, extending both upwardly and downwardly beyond the longitudinal frame members. As illustrated, the rear and front seat columns 20 and 21 may be generally parallel and inclined rearwardly.

The saddle or seat 14 is disposed generally horizontally and longitudinally of the frame 11, and is mounted on the upper ends of both rear and front seat columns 20 and 21, extending forwardly and rearwardly therebeyond. As best seen in FIGURE 2, the seat or saddle 14 includes a relatively wide rear portion 23 and a relatively narrow front portion 24, which portions are sized and configured to seat a pair of occupants disposed one behind the other. The rear portion 23 is intended for the larger occupant, and the front portion 24 for the smaller occupant.

At the lower ends of the rear and front seat columns 20 and 21 are provided a pair of forwardly and rearwardly spaced, laterally extending journal tubes or pedal supports 26 and 27, respectively. That is, the journal or pedal support tube 26 is rigidly fixed to the lower end of rear seat column 20, and the journal or pedal support tube 27 is rigidly fixed to the lower end of front seat column 21. Extending generally horizontally between the pedal supports 26 and 27 are a pair of longitudinal, lower frame members 28. The frame members 28 thus have their rear and front ends fixedly secured to the pedal journals 26 and 27 respectively; and an additional frame member or brace 29 may have its rear end fixed to the front pedal support 27 and extend generally forwardly and upwardly to a point of fixed securement with the steering column 19. A reinforcing strut 30 may extend between the brace 29 and intermediate frame members 18, being fixedly secured therebetween.

Journaled in the steering column 19 and depending obliquely forwardly therefrom is a front wheel fork 32. The front wheel 12 is interposed in the fork 32 and rotatably supported therein by suitable bearing means 33.

A handlebar bracket 35 extends upward from the steering column 19, being suitably fixed to the fork 32, and carries a handlebar 15 which extends laterally outward in opposite directions. At opposite ends of the handlebar 15 are a pair of rearwardly extending handgrips 36, each including a forward gripping portion 37 and a rearward gripping portion 38. The handgrips 36 and each of their gripping portions 37 and 38 are of suitable size and configuration so as to accommodate a pair of hands. Thus, each forward gripping portion 37 may accommodate one hand, and each rearward gripping portion 38 may accommodate one hand, so that both occupants of the seat 14 may simultaneously grip the handgrips 36. The forward occupant may conveniently grip the forward portions 37 and the rearward occupant may conveniently grip the rearward portions 38.

Extending rearwardly and downwardly from the upper region of rear seat column 20 are a pair of laterally spaced, rear-wheel support members 40. A pair of additional rear-wheel support members 41 may extend in laterally spaced relation generally horizontally rearward from the rear pedal journal 26 to respective lower ends of members 40. The rear wheel 13 is interposed between the pair of support members 40, and also between the pair of support members 41 and may be rotatably mounted in position by suitable bearing means 42 at the juncture of support members 40 and 41.

Rotatably carried by the rear pedal support 26 are a pair of rear pedals 43 and associated pedal arms or cranks 44. Similarly, a pair of front pedals 45 and associated arms or cranks 46 are rotatably carried by the front pedal support 27. The rear and front pedal assemblies may each have a pedal and associated crank on respective opposite sides of the frame 11, and spaced approximately 180 degrees apart, in the conventional manner.

Carried by the rear pedal assembly 43, 44 for rotation therewith is a relatively large sprocket wheel 47, and a relatively small sprocket wheel 48. A sprocket wheel 49 is carried by the rear ground-engageable wheel 13, and a chain 50 is trained about the sprocket wheels 47 and 49 to positively connect the same. Thus, the rear ground-engageable wheel 13 is driven by the rear pedal assembly 43, 44 through the sprocket-and-chain drive means 47, 49 and 50. As the sprocket wheel 47 is relatively large, the driving ratio is one of relatively high velocity.

Carried by the front pedal assembly 45, 46 is a front sprocket wheel 52 for rotation with the front pedal assembly. The sprocket wheel 52 may be of relatively small diameter, substantially equal to that of sprocket wheel 48, and a chain 53 may be trained about the sprocket wheels 52 and 48. Thus, the sprocket wheels 48 and 52 and chain 53 combine to define drive means for driving the rear pedal assembly 43, 44 from the front pedal assembly 45, 46. Of course, this power from the front pedal assembly to the rear pedal assembly is transmitted through the sprocket wheel 47 and chain 50 to the rear wheel 13. As the front sprocket wheel 52 is of relatively small diameter, as compared to the sprocket wheel 47, the front pedal assembly 45 and 46 is relatively easy to operate.

Thus, the larger occupant seated on the rear seat portion 23 carries the greater pedaling load, while the front occupant carries a lesser pedaling load.

From the foregoing, it is seen that the present invention provides a tandem-bicycle construction which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A bicycle construction comprising a frame, a depending fork journaled at the front of said frame, a rear-wheel support at the rear of said frame, front and rear wheels respectively rotatably carried by said fork and rear-wheel support, a single seat mounted on the upper rear region of said frame and having front and rear portions for accommodating a plurality of occupants, a single laterally extending handle bar at the upper front region of said frame and fixed to said fork for turning the latter, a pair of rearwardly extending handgrips at opposite ends of said handlebar each having front and rear gripping portions for respective occupants of said seat, drive means connected between a lower region of said frame and said rear wheel, and forwardly and rearwardly spaced pairs of rotary pedals carried by a lower region of said frame and connected to said drive means for operation by respective occupants.

2. A bicycle construction according to claim 1, said frame comprising a plurality of forwardly and rearwardly spaced upstanding seat columns, said seat being mounted on the upper ends of said columns and said pairs of pedals being carried at the lower ends of respective columns, and said drive means comprising a rear chain drive between the rear pedal pair and said rear wheel, and a front chain drive between said pairs of pedals.

3. A bicycle construction according to claim 2, said rear chain drive having a higher velocity ratio than said front chain drive.

4. A bicycle construction comprising a frame, a fork journaled at the front of said frame, a rear-wheel support at the rear of said frame, front and rear wheels respectively rotatably carried by said fork and rear-wheel support, a single laterally extending handlebar at the front of said frame fixed to said fork, rearwardly extending handgrips at opposite ends of said handlebar, a single seat mounted at the rear of said frame and having forward and rearward portions for accommodating a plurality of occupants, sprocket-and-chain drive means connected between a lower region of said frame and said rear wheel, and forward and rearward spaced pairs of rotatable pedals carried by said frame and connected to said drive means for operation by respective occupants, each of said handgrips having front and rear portions for accommodating hands of respective occupants.

References Cited by the Examiner

UNITED STATES PATENTS

| 886,889 | 5/08 | Stokes | 74—551.9 |
| 1,961,145 | 6/34 | Harley et al. | 297—195 X |
| 2,397,441 | 3/46 | Schwinn | 280—231 X |
| 2,493,561 | 1/50 | Williams | 280—213 X |
| 3,092,362 | 6/63 | Walsh | 280—7.16 X |

FOREIGN PATENTS

| 22,553 | 1895 | Great Britain. |
| 22,342 | 1897 | Great Britain. |

A. HARRY LEVY, *Primary Examiner.*

KENNETH H. BETTS, *Examiner.*